US 12,177,212 B2

United States Patent
Corona et al.

(10) Patent No.: US 12,177,212 B2
(45) Date of Patent: Dec. 24, 2024

(54) ENHANCED N17 INTERFACE BETWEEN IMS NETWORK AND 5G-EIR

(71) Applicant: T-Mobile USA, Inc., Bellevue, WA (US)

(72) Inventors: A. Karl Corona, Maple Valley, WA (US); Jim Udom, Woodinville, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 157 days.

(21) Appl. No.: 17/071,664

(22) Filed: Oct. 15, 2020

(65) Prior Publication Data

US 2022/0124091 A1 Apr. 21, 2022

(51) Int. Cl.
*H04L 9/40* (2022.01)
*H04L 65/1016* (2022.01)
(Continued)

(52) U.S. Cl.
CPC ...... *H04L 63/0876* (2013.01); *H04L 65/1016* (2013.01); *H04L 65/1066* (2013.01);
(Continued)

(58) Field of Classification Search
CPC .............. H04L 63/0879; H04L 65/1006; H04L 65/1016; H04L 65/1066; H04L 67/02; H04W 8/04; H04W 84/042
(Continued)

(56) References Cited

U.S. PATENT DOCUMENTS

| 2017/0208462 A1* | 7/2017 | Zaifuddin | ........... H04W 12/122 |
| 2019/0059024 A1* | 2/2019 | Mufti | .................. H04L 65/1069 |
| 2020/0358909 A1* | 11/2020 | Ahmadi | .............. H04L 65/1016 |

FOREIGN PATENT DOCUMENTS

WO   WO-2020049210 A1 * 3/2020 ........... H04L 63/101

OTHER PUBLICATIONS

Etsi et al. ("5G; system Architecture for the 5G system", 3GPP TS 23.501 Version 15.2.0 Release 15; Jun. 2018 ETSI TS 123 501 V15.2.0) (Year: 2018).*

(Continued)

*Primary Examiner* — Suraj M Joshi
(74) *Attorney, Agent, or Firm* — Lee & Hayes, P.C.

(57) ABSTRACT

In a telecommunication network, a Serving Call Session Control Function (S-CSCF) may be coupled with a Fifth Generation (5G) Equipment Identity Register (EIR) via an N17' interface. In some examples, the S-CSCF can use the N17' interface instead of a diameter protocol for communicating with the 5G-EIR. The S-CSCF can send a request to the 5G-EIR including a Permanent Equipment Identifier (PEI) associated with a user equipment (UE). In response, the S-CSCF can receive identity data indicative of whether the UE is authorized, not authorized, partially authorized, or unknown. Based on the identity data, the S-CSCF can authenticate a user equipment (UE) accessing a network. In some examples, the S-CSCF may route requests between a 5G-EIR and an EIR. In some examples, this authentication step can comprise a second-level authentication to identify stolen or fraudulent devices and to prevent such devices from accessing the network.

16 Claims, 8 Drawing Sheets

(51) Int. Cl.
*H04L 65/1066* (2022.01)
*H04L 65/1104* (2022.01)
*H04L 67/02* (2022.01)
*H04W 8/04* (2009.01)
*H04W 84/04* (2009.01)

(52) U.S. Cl.
CPC .......... *H04L 65/1104* (2022.05); *H04L 67/02* (2013.01); *H04W 8/04* (2013.01); *H04W 84/042* (2013.01)

(58) Field of Classification Search
USPC .......................................................... 726/4
See application file for complete search history.

(56) References Cited

OTHER PUBLICATIONS

3GPP, "Technical Specification Group Core Network and Terminals; Cx and Dx interfaces based on the Diameter protocol; Protocol Details" (Release 16), 3rd Generation Partnership Project, vol. CTWG4, No. V16.0.0, Sep. 24, 2019, pp. 1-41.

3GPP, "Technical Specification Group Services and System Aspects; System Architecture for the 5G System (5GS); Stage 2", 3rd Generation Partnership Project, vol. SA WG2, No. V16.4.0, Mar. 27, 2020, pp. 1-430.

3GPP, "Technical Specification Group Core Network and Terminals; IP Multimedia (IM) Subsystem Cx and Dx Interfaces; Signalling flows and message contents" (Release 16), 3rd Generation Partnership Project, vol. CTWG4, No. V16.0.0, Sep. 24, 2019, pp. 1-82.

Deutsche Telekom, "Service Offered by the 5G-EIR NF-Corrections and Cleanup", 3rd Generation Partnership Project, vol. CT WG4, Feb. 14, 2018, 4 pages.

Extended European Search Report mailed Jan. 26, 2022 for European Patent Application No. 21200940.1, 16 pages.

The European Office Action mailed Mar. 7, 2023 for European patent application No. 21200940.1, a foreign counterpart of U.S. Appl. No. 17/071,664, 12 pages.

* cited by examiner

ENHANCED N17 INTERFACE BETWEEN IMS NETWORK AND 5G-EIR

BACKGROUND

A telecommunication network can include an IP Multimedia Subsystem (IMS) that can manage communication sessions for mobile phones and other user equipment (UE). For example, an IMS can include elements that set up communication sessions for a UE and that provide services during such communication sessions, such as services for voice calls, video calls, or messaging.

An IMS registration process can occur when a UE attaches to the telecommunication network. During IMS registration, the UE can attach to, and/or be assigned to, various IMS elements. The IMS elements can handle message routing, provide services, or otherwise assist with communication sessions for the UE.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
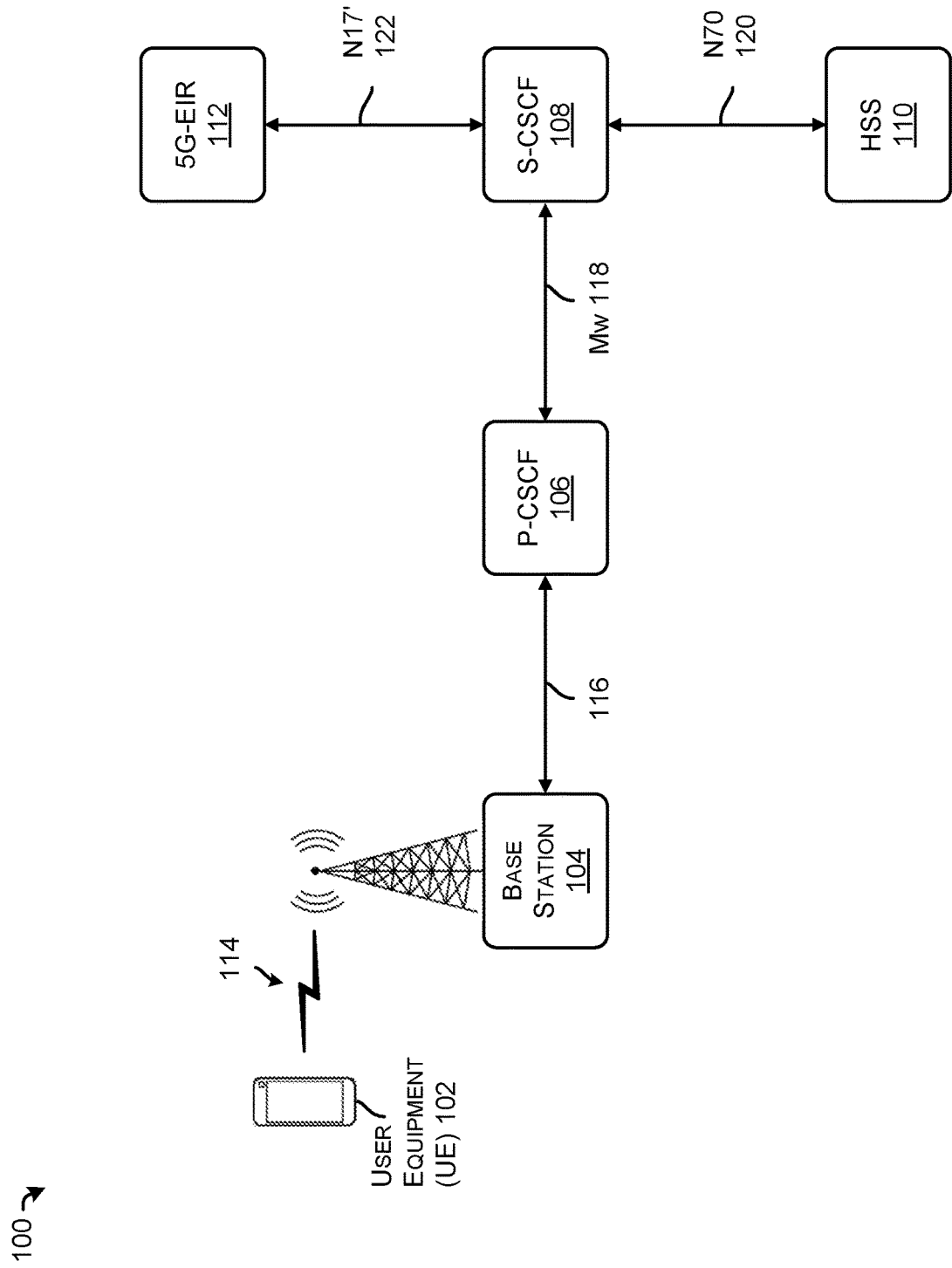
FIG. 1 is a block diagram of system including a user equipment, a base station, a Proxy Call Session Control Function (P-CSCF), a Serving CSCF (S-CSCF), a Home Subscriber Server (HSS), and a Fifth Generation (5G) Equipment Identity Register (5G-EIR).

Described herein are systems including an N17' interface coupling a Serving Call Session Control Function (S-CSCF) and a Fifth Generation (5G) Equipment Identity Register (EIR), and techniques for using the same. In some examples, the S-CSCF can use the N17' interface instead of a diameter protocol (e.g., an S13' diameter interface) for communicating with the 5G-EIR. In some examples, the S-CSCF can send a request to the 5G-EIR including an International Mobile Equipment Identity (IMEI) and/or a Permanent Equipment Identifier (PEI) and can receive identity data in response. In some examples, the identity data may include an indication of whether a user equipment (UE) associated with the IMEI and/or PEI is authorized, unauthorized, partially authorized, or unknown. Based at least in part on the identity data, the S-CSCF can authenticate the UE accessing a network. In some examples, this authentication step can comprise a second-level authentication to identify stolen or fraudulent devices and to prevent such devices from accessing the network.

The devices and components discussed herein can be implemented in a telecommunication network including an IP Multimedia Subsystem (IMS). An IMS can set up and manage communication sessions for user equipment (UE), such as sessions for voice calls, video calls, or other types of communications. An IMS can include Call Session Control Functions (CSCFs) that can register UEs with the IMS and manage communication sessions. The IMS can also include application servers that provide services for the communication sessions, such as services for voice calls, video calls, or other types of communications. For example, the IMS can include a telephony application server (TAS) that provides telephony services, such as services for voice and/or video calls.

When a UE attaches to the telecommunication network, an Access and Mobility Management Function (AMF) or a Mobility Management Entity (MME) can initially authenticate the UE and an IMS registration process can occur. During IMS registration, the UE can send a registration message to a Proxy CSCF (P-CSCF) in the IMS. The P-CSCF can forward the registration message to an Interrogating CSCF (I-CSCF), which can assign the UE to a particular Serving CSCF (S-CSCF). The S-CSCF can further authenticate the UE to complete the registration with the IMS. The S-CSCF can also send third party registration messages about the UE to one or more application servers, and the application servers can, in response, provide services for the communication session(s) associated with the UE.

In some examples, an IMS may include a 5G-EIR and an EIR (e.g., associated with a Fourth Generation (4G) network). In some examples, a S-CSCF may be configured to receive an International Mobile Subscriber Identity (IMSI) associated with a UE and, based at least in part on the IMSI, can determine whether to query the 5G-EIR or the EIR for identity data using PEI or an International Mobile Equipment Identity (IMEI) associated with the UE. In some examples, the S-CSCF may be configured to query one of the 5G-EIR or the EIR before querying the other component. For example, the S-CSCF can query the 5G-EIR using PEI for identity data, and if a result is not returned or information associated with a UE is not found, the S-CSCF can query the EIR using IMEI for identity data. In some examples, a S-CSCF can communicate with an EIR via an S13' interface.

In some examples, the 5G EIR or EIR, in response to receiving PEI, IMEI, and/or IMSI associated with a UE, can return a result indicating that the UE is authorized (e.g., associated with an approved list or unblocked list), unauthorized (e.g., associated with a non-approved list or blocked list), partially authorized (e.g., associated with a partially-approved list whereby additional verification may be required or certain actions are limited), or unknown. Various policies may be associated with the different identity data provided by the 5G EIR and/or the EIR.

In some examples, an N17 interface is defined as the interface between an Access and Mobility Management Function (AMF) and a 5G-EIR is a 5G network. The AMF may request identity information associated with a UE via a "GET" command sent to the 5G-EIR. As discussed herein, the N17' interface (also referred to as an enhanced N17 interface) may be configured between the 5G-EIR and the S-CSCF. The N17' interface may comprise a Representational State Transfer (REST) HTTP 2.0 interface.

In some examples, the use of an N17' interface between an S-CSCF and a 5G-EIR improves the functioning of a network by providing a second-level authentication by the S-CSCF. This authentication by the S-CSCF can reduce fraud, reduce the use of stolen UE, or prevent any devices associated with a blocked list from accessing a network. In some examples, this second-level authentication can be used in the case of a UE accessing a network via a non-3GPP access, such as Wi-Fi.

Implementations of the systems and techniques discussed herein can further include a Network Repository Function (NRF) and/or a Service Communication Proxy (SCP) for scaling a network. For example, the NRF can maintain an overview of the network architecture and the network components (e.g., 4G and/or 5G components) associated with the network. The NRF can maintain profiles of available Network Function (NF) instances (e.g., P-CSCF, S-CSCF, 5G-EIR, HSS, etc.) and their supported services in the network, can allow consumer NF instances to discover other provider NF instances in the network, and can allow NF instances to track the status of other NF instances. Further, the SCP can include functionality to view and/or access messages arriving for a particular type of NF and can route messages to different NFs based on round robin, weighted round robin, transaction latency, location-based selection (e.g., source or destination), etc. while factoring in the current load, expected load, historical load, and NF availability.

In some examples, the network implementations discussed herein can be implemented in the context of protocols associated with one or more of 3G, 4G, 4G LTE, 5G protocols. In some examples, the network implementations can support standalone architectures, non-standalone architectures, dual connectivity, carrier aggregation, etc. Example implementations are provided below with reference to the following figures.

FIG. 1 is a block diagram of system 100 including a user equipment (UE) 102, a base station 104, a Proxy Call Session Control Function (P-CSCF) 106, a Serving CSCF (S-CSCF) 108, a Home Subscriber Server (HSS) 110, and a Fifth Generation (5G) Equipment Identity Register (5G-EIR) 112.

The UE 102 can connect to an access point, such as the base station 104, through which the UE 102 can access a core network of the telecommunication network. The base station 104 and/or core network can be compatible with one or more wireless access technologies, protocols, or standards. For example, wireless access technologies can include Fifth Generation (5G) technology, Long Term Evolution (LTE)/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax technology, Wi-Fi technology, and/or any other previous or future generation of wireless access technology.

In some examples, the base station 104 can be part of a radio access network linked to a core network comprising at least the P-CSCF 106, the S-CSCF 108, the HSS 110, and the 5G-EIR 112. In some examples, the base station 104 can comprise an evolved Node B (eNodeB or eNB) in an LTE network or a gNB (or gNodeB) in a 5G network. In other examples, the base station 104 can comprise a Wi-Fi access point or other type of access point that can be connected to the core network through the Internet or another type of connection.

In some implementations, the base station 104 is part of a Non-Standalone (NSA) architecture. For instance, the base station 104 may include both a 4G transceiver by which the base station 104 can establish LTE radio link(s) and a 5G transceiver by which the base station 104 can establish NR radio link(s). In some cases, functions (e.g., transmission intervals, transmission power, etc.) of the 4G transceiver and the 5G transceiver are coordinated by the base station 104. In some examples, the base station 104 may include functionality to function as a Standalone (SA) architecture.

The UE 102 and/or the base station 104 may be capable of supporting 4G radio communications, such as LTE radio communications, and 5G radio communications, such as New Radio (NR) communications. In some examples, either or both of the UE 102 and the base station 104 may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

The terms "user equipment (UE)," "user device," "wireless communication device," "wireless device," "communication device," "mobile device," and "client device," can be used interchangeably to describe any UE (e.g., the UE 102) that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

Examples of UEs (e.g., the UE 102) can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

As noted above, the UE 102 may register with the network via an IMS registration procedure. During IMS registration, the UE 102 can send a registration message via an interface 114 (e.g., an N1 interface) to the base station 104, which in turn may transmit the registration message (e.g., a SIP INVITE) to the P-CSCF 106 via an interface 116. For the purpose of discussion here, the P-CSCF 106 can forward the registration message to an assigned S-CSCF 108 (e.g., assigned via an I-CSCF) via an Mw interface 118 (e.g., a SIP (session initiation protocol) and SDP (session description protocol) interface).

The S-CSCF 108 can receive the registration message (e.g., SIP INVITE), which may include a subscription identifier associated with the UE 102. The S-CSCF 108 can send a request via the N70 interface 120 to the HSS 110. In some examples, the request can comprise the subscription identifier, and in some examples, the HSS 110 can send to the S-CSCF 108, in response to the message from the S-CSCF, an IMSI associated with the UE 102.

The S-CSCF 108 can send, via an N17' interface 122 and to the 5G-EIR 112, a request for identity information associated with the UE 102. In some examples, such a request can be in accordance with a RESTful HTTP 2.0 protocol. In some examples, the request can comprise a "GET" command. In some examples, the request can comprise PEI, IMEI, and/or IMSI. In some examples, the 5G-EIR 112 can respond to the request from the S-CSCF 108 with identity data indicative of whether the UE is authorized, not authorized, partially authorized, or unknown. The S-CSCF 108 can authenticate the UE 102 based at least in part on the identity data received from the 5G-EIR 112.

Figure 2:
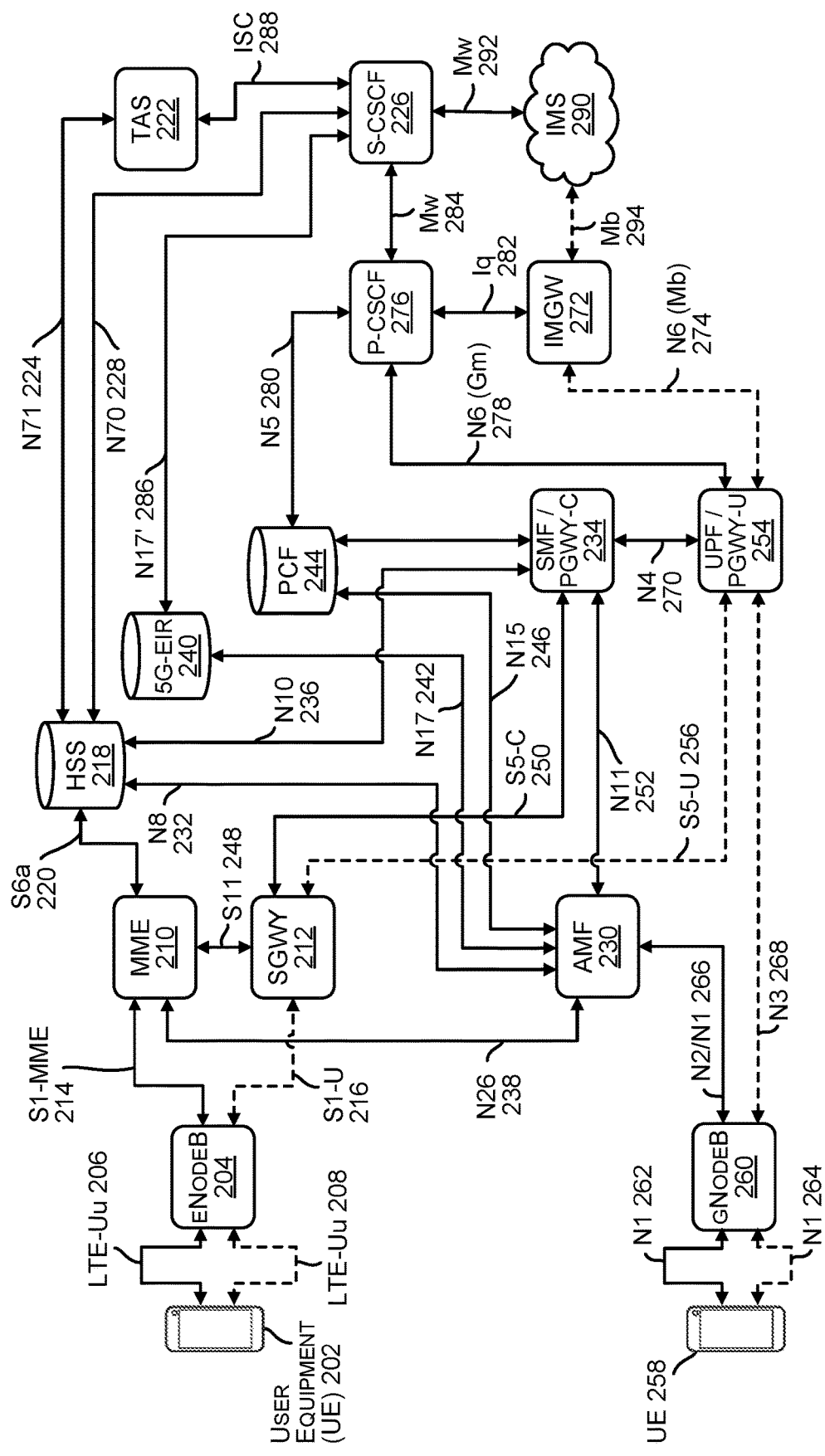
FIG. 2 is a block diagram of another system including a N17' interface between a S-CSCF and a 5G-EIR.

FIG. 2 is a block diagram of another system 200 including a N17' interface between a S-CSCF and a 5G-EIR.

In some examples, the system 200 can comprise a user equipment (UE) 202 in communication with an eNodeB 204. The UE 202 can transmit and receive control plane data with the eNodeB 204 via the LTE-Uu interface 206. The UE 202 can transmit and receive user plane data with the eNodeB 204 via the LTE-Uu interface 208. In some examples, the eNodeB 204 can correspond to the base station 104 of FIG. 1.

The eNodeB 204 is coupled to the MME (Mobility Management Entity) 210 and the SGWY (Serving Gateway) 212 via the S1-MME interface 214 and the S1-U interface 216, respectively.

In some examples, the MME 210 can include functionality to manage communication sessions, authentication, paging, mobility bearers, and roaming.

In some examples, the SGWY 212 can include functionality to manage handovers with neighboring base stations (e.g., other eNodeBs), manage data transfer of packets across a user plane, maintain UE state during idle, and generate paging requests when data arrives for the UE in a downlink direction.

The MME 210 may be coupled to the HSS (Home Subscriber Server) 218 via a S6a interface 220. In some examples, the HSS 218 can include functionality to provide subscriber profile and authentication information. The HSS 218 can store information about subscribers, device information, user location information, subscription information, etc. In some examples, the HSS 218 can correspond to the HSS 110 of FIG. 1.

The HSS 218 can be coupled to a TAS (Telephony Application Server) 222 via an N71 interface.

The HSS 218 can be coupled to a S-CSCF 226 via an N70 interface 228.

The S-CSCF 226 can include functionality to conduct registration and session control for the sessions associated with a registered UE. In some examples, the S-CSCF 226 can make a determination to allow or deny service to a UE. In some examples, the S-CSCF 226 can correspond to the S-CSCF 108 of FIG. 1.

The HSS 218 can be coupled to an AMF (Access and Mobility Management Function) 230 via an N8 interface 232.

The AMF 230 can include functionality to receive connection and session related information from a UE (e.g., the UE 258). Further, the AMF 230 can manage the UE registration procedure and can page UEs when downlink data is to be transferred to the UE.

The HSS 218 can be coupled to an SMF (Session Management Function)/PGWY-C (Packet Data Network Gateway Control Plane Function) 234 via an N10 interface 236.

In some examples, the SMF/PGWY-C 234 can include functionality to manage UE sessions, allocate IP addresses to a UE, and manage control plane communications associated with a UE.

The MME 210 can be coupled to the AMF 230 via an N26 interface 238.

The AMF 230 can be coupled to a 5G-EIR (Fifth Generation Equipment Identity Register) 240 via an N17 interface 242.

In some examples, the 5G-EIR 240 can include functionality to provide Permanent Equipment Identity (PEI) information in response to a request. As discussed herein, the 5G-EIR 240 can provide PEI to the AMF 230 via the N17 interface 242 or to a S-CSCF via another N17' interface (e.g., the S-CSCF 226 and the N17' interface 286 discussed below). In some examples, the 5G-EIR 240 can correspond to the 5G-EIR 112 of FIG. 1.

In some examples, the AMF 230 can be coupled to a PCF (Policy Control Function) 244 via an N15 interface 246.

In some examples, the PCF 244 can include functionality to manage network slicing, roaming, and mobility management.

The MME 210 can be coupled to the SGWY 212 via a S11 interface 248.

The SGWY 212 can be coupled to the SMF/PGWY-C via a S5-C interface 250.

The SMF/PGWY-C 234 can be coupled to the AMF 230 via an N11 interface 252.

The SGWY 212 can be coupled to a UPF (User Plane Function)/PGWY-U (Packet Data Network Gateway User Plane Function) 254 via a S5-U interface 256.

In some examples, the UPF/PGWY-U 254 can include functionality to route and forward packets, validate uplink traffic, classify uplink traffic, manage Quality of Service (QoS) for user plane traffic, downlink data buffering, and the like.

A UE 258 can be coupled to a gNodeB 260 via an N1 interface 262 (e.g., for transmitting and receiving control plane data) and an N1 interface 264 (e.g., for transmitting and receiving user plane data). In some examples, the gNodeB 260 can correspond to the base station 104 of FIG. 1.

The gNodeB 260 may be coupled to the AMF 230 via an N2/N1 interface 266.

The gNodeB 260 may be coupled to the UPF/PGWY-U 254 via an N3 interface 268.

The UPF/PGWY-U 254 can be coupled to the SMF/PGWY-C 234 via an N4 interface 270.

The UPF/PGWY-U 254 can be coupled to the IMGW (IMS-MGW (IP Multimedia Subsystem—Master Gateway)) 272 via an N6 (Mb) interface 274.

In some examples, the IMGW 272 can represent the master gateway that anchors a user plane associated with the UE 258. In some examples, the IMGW 272 can include functionality to manage user plane traffic, generate and/or terminate RTP/RTCP traffic, perform transcoding operations, detect user plane error conditions, reports key performance indicators (KPIs) for voice calls, and the like. In some examples, the IMGW 272 can pass other types of user plane traffic, such as MSRP, for RCS.

The UPF/PGWY-U 254 can be coupled to a P-CSCF (Proxy Call Session Control Function) 276 via an N6 (Gm) interface 278.

In some examples, the P-CSCF 276 can function as entry point for traffic into the IP Multimedia Subsystem (IMS). The P-CSCF 276 can assist with authentication, inspect signals, compress and decompress SIP messages, and can function as a proxy server for user equipment. The P-CSCF 276 can validate and forward requests from UE to network elements, and can process and forward responses to such UEs. In some examples, the P-CSCF 276 can correspond to the P-CSCF 106 of FIG. 1.

The P-CSCF 276 can be coupled to the PCF 244 via an N5 interface 280.

The P-CSCF 276 can be coupled to the IMGW 272 via an Iq interface 282. In some examples, the Iq interface 282 can represent a control interface between the P-CSCF 276 and the IMGW 272. In the case of SRVCC support, the P-CSCF can comprise an ATCF, and the IMGW 272 can comprise an ATGW.

The P-CSCF 276 can be coupled to the S-CSCF 226 via an Mw interface 284.

The S-CSCF 226 can be coupled to the 5G-EIR 240 via an N17' interface 286.

The S-CSCF 226 can be coupled to the TAS 222 via an ISC interface 288.

The S-CSCF 226 can be coupled to an IMS 290 (IP Multimedia Subsystem) via a Mw interface 292.

In some examples, the IMS 290 can comprise one or more IMS nodes including but not limited to P-CSCF, IMS-MGW, S-CSCF, I-CSCF, BGCF, TAS, and/or other application servers for messaging. In some examples, the IMS 290 can comprise ISBC for off-network connection. Further, in some examples, the IMS 290 can comprise data base systems including an HSS, PCRF, EIR, and the like.

The IMS 290 can be coupled to the IMGW 272 via a Mb interface 294.

Additional aspects of the system 200 are discussed below in FIG. 5, as well as throughout the disclosure. In some examples, functionality of any nodes may be performed by any other node in the system 200.

Figure 3:
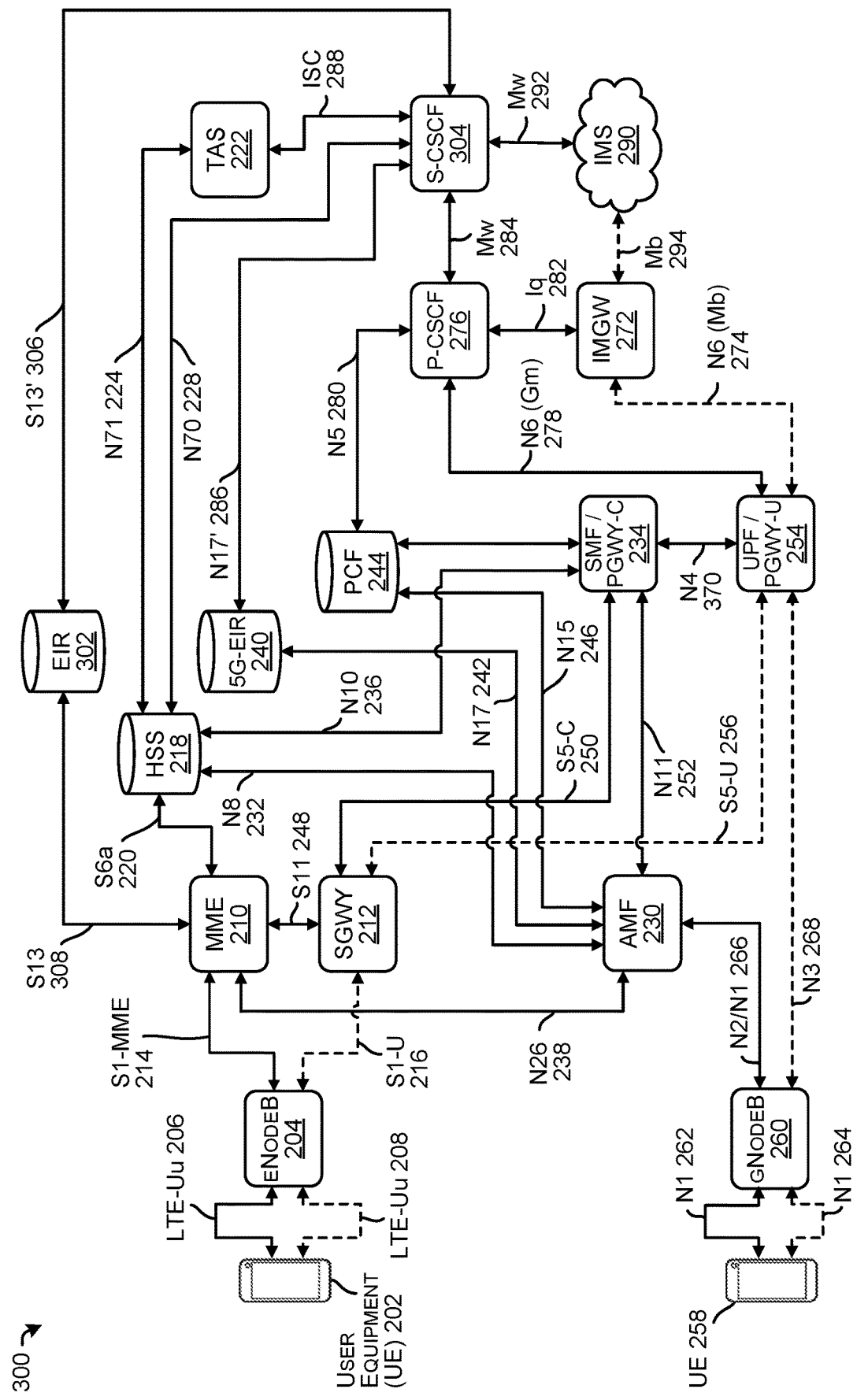
FIG. 3 is a block diagram of another system including an S13' interface between a S-CSCF and an EIR.

FIG. 3 is a block diagram of another system 300 including an S13' interface between a S-CSCF and an EIR.

For example, the system 300 substantially corresponds to the system 200 of FIG. 2 but differs in that the system 300 includes an EIR (Equipment Identity Register) 302 coupled to a S-CSCF 304 via an S13' interface 306. The EIR 302 can be further coupled to the MME 210 via a S13 interface 308.

In some examples, the S-CSCF 304 can substantially correspond to the S-CSCF 226 in FIG. 2. However, the S-CSCF 304 can include functionality to route requests for device information to one or both of the 5G-EIR 240 via the N17' interface 286 and the EIR 302 via the S13' interface 306.

In some examples, the S-CSCF 304 may be configured to receive an IMSI associated with a UE (e.g., the UE 202 or 258) and, based at least in part on the IMSI, can determine whether to query the 5G-EIR 240 for identity data using PEI or the EIR 302 for identity data using an International Mobile Equipment Identity (IMEI) associated with the UE.

In some examples, the S-CSCF 304 may be configured to query one of the 5G-EIR 240 or the EIR 302 before querying the other component. For example, the S-CSCF 304 can query the 5G-EIR 240 for identity data using PEI, and if a result is not returned or information associated with a UE is not found, the S-CSCF 304 can query the EIR 302 for identity data using IMEI.

Figure 4:
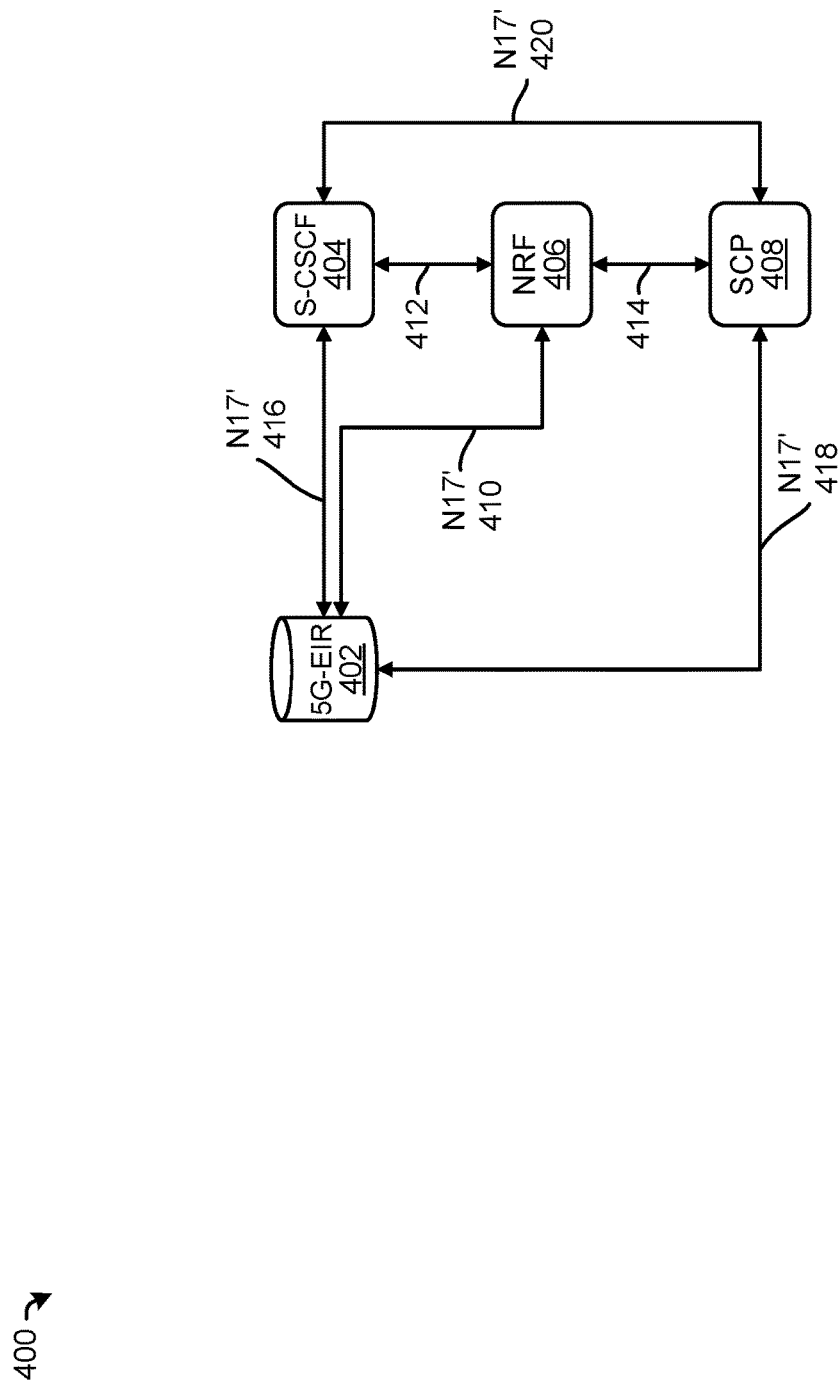
FIG. 4 is a block diagram of another system including a 5G-EIR, a S-CSCF, a Network Repository Function (NRF), and a Service Communication Proxy (SCP).

FIG. 4 is a block diagram of another system 400 including a 5G-EIR 402, a S-CSCF 404, a Network Repository Function (NRF) 406, and a Service Communication Proxy (SCP) 408. In some examples, the system 400 can be implemented in the context of (e.g., within or in connection with) systems 100, 200, or 300.

In some examples, the 5G-EIR 402 can correspond to the 5G-EIR 112 and 240, as discussed herein. In some examples, the S-CSCF 404 can correspond to the S-CSCF 108, 226, or 304, as discussed herein.

In some examples, the NRF 406 can be coupled with the 5G-EIR 402 via an N17' interface 410. The NRF 406 can be coupled with the S-CSCF 404 via an interface 412. The NRF 406 can be coupled to the SCP 408 via an interface 414.

The 5G-EIR 402 can be coupled with the S-CSCF 404 via an N17' interface 416. The 5G-EIR 402 can be coupled to the S-CSCF 404 via an N17' interface 416. In some examples, the 5G-EIR 402 can be coupled with the SCP 408 via an N17' interface 418.

In some examples, the S-CSCF 404 can be coupled with the SCP 408 via an N17' interface 420.

In some examples, the NRF (Network Repository Function) 406 can include functionality to maintain profiles of available Network Function (NF) instances (e.g., P-CSCF, S-CSCF, 5G-EIR, HSS, etc.) and their supported services in the network, facilitate consumer NF instances to discover other provider NF instances in the network, and facilitate NF instances to track the status of other NF instances.

In some examples, the SCP 408 can include functionality to perform load balancing, provide alternate traffic routing, perform traffic prioritization, and perform signaling aggregation and routing, as well as other functions. When a network function deployment is discovered by the NRF 406, the entry point to the network function cluster may be the SCP 408. Thus, the SCP 408 can provide traffic aggregation for multiple instances of a particular network function.

In general, in implementations where there are multiple instances of the 5G-EIR 402 and/or the S-CSCF 404, the NRF 406 can instruct the S-CSCF 404 to request device information from a particular instance of the 5G-EIR 402. Thus, the NRF 406 and/or the SCP 408 can provide a flexible framework for scaling and aggregation as the systems 100, 200, or 300 grow, evolve, or otherwise change.

Figure 5:
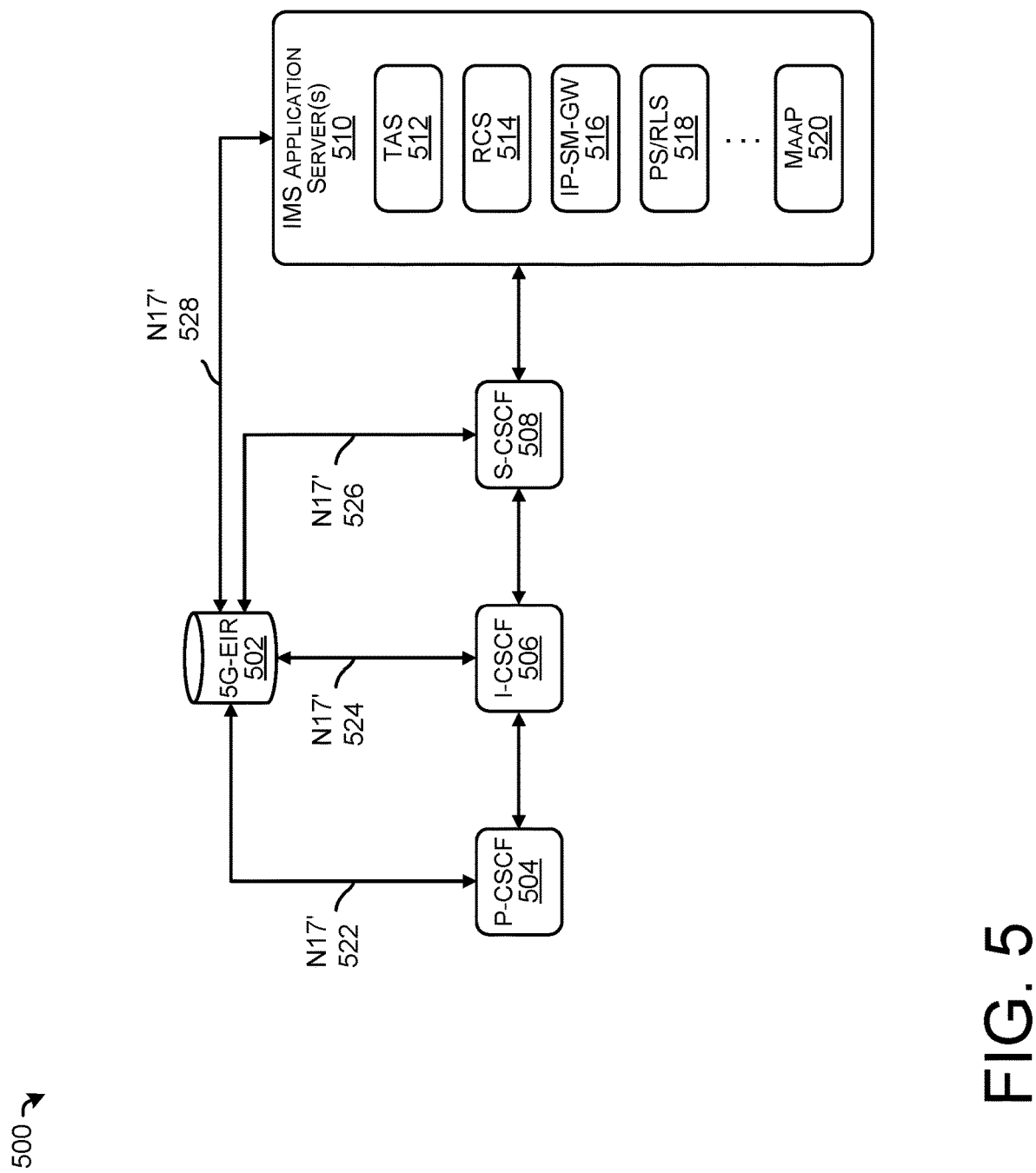
FIG. 5 is a block diagram of another system including a 5G-EIR with enhanced N17 connection(s) with various component of a network.

FIG. 5 is a block diagram of another system 500 including a 5G-EIR 502 with enhanced N17 connection(s) with various component of a network.

For example, the system 500 can include a P-CSCF 504, an I-CSCF 506, an S-CSCF 508, and IMS application server(s) 510 comprising one or more of a TAS 512, an RCS 514, an IP-SM-GW 516, a PS/RLS 518, and/or a MaaP 520.

In some examples, the 5G-EIR 502 can correspond to the 5G-EIR 112, 240, or 402, as discussed herein.

In some examples, the P-CSCF 504 can correspond to the P-CSCF 106 or 276, as discussed herein.

In some examples, the I-CSCF 506 can represent an Interrogating-CSCF.

In some examples, the S-CSCF 508 can correspond to the S-CSCF 108, 226, 304, or 404 as discussed herein.

In some examples, the IMS application servers 510 can correspond to the IMS 290.

In some examples, the TAS 512 can correspond to the TAS 222, as discussed herein.

In some examples, the RCS 514 can represent a Rich Communication Suite (RCS) server.

In some examples, the IP-SM-GW 516 can represent an Internet Protocol-Short Message-Gateway.

In some examples, the PS/RLS 518 can represent a Presence Server (PS) and/or a Resource List Server (RLS).

In some examples, the MaaP 520 can represent a Messaging as a Platform server.

In some examples, the 5G EIR 502 can be coupled with the respective network functions and nodes via an N17' interface, examples of which are illustrated as N17' interfaces 522, 524, 526, and 528. That is, the N17' interface can be extended to any network functions and/or servers, and is not limited to any single function or server, as discussed herein. Accordingly, each network function or server may request data from the 5G-EIR and may incorporate such data into each respective operation such that individual functions or servers can authenticate UEs associated with respective processing, thereby enhancing a security of a network.

Figure 6:
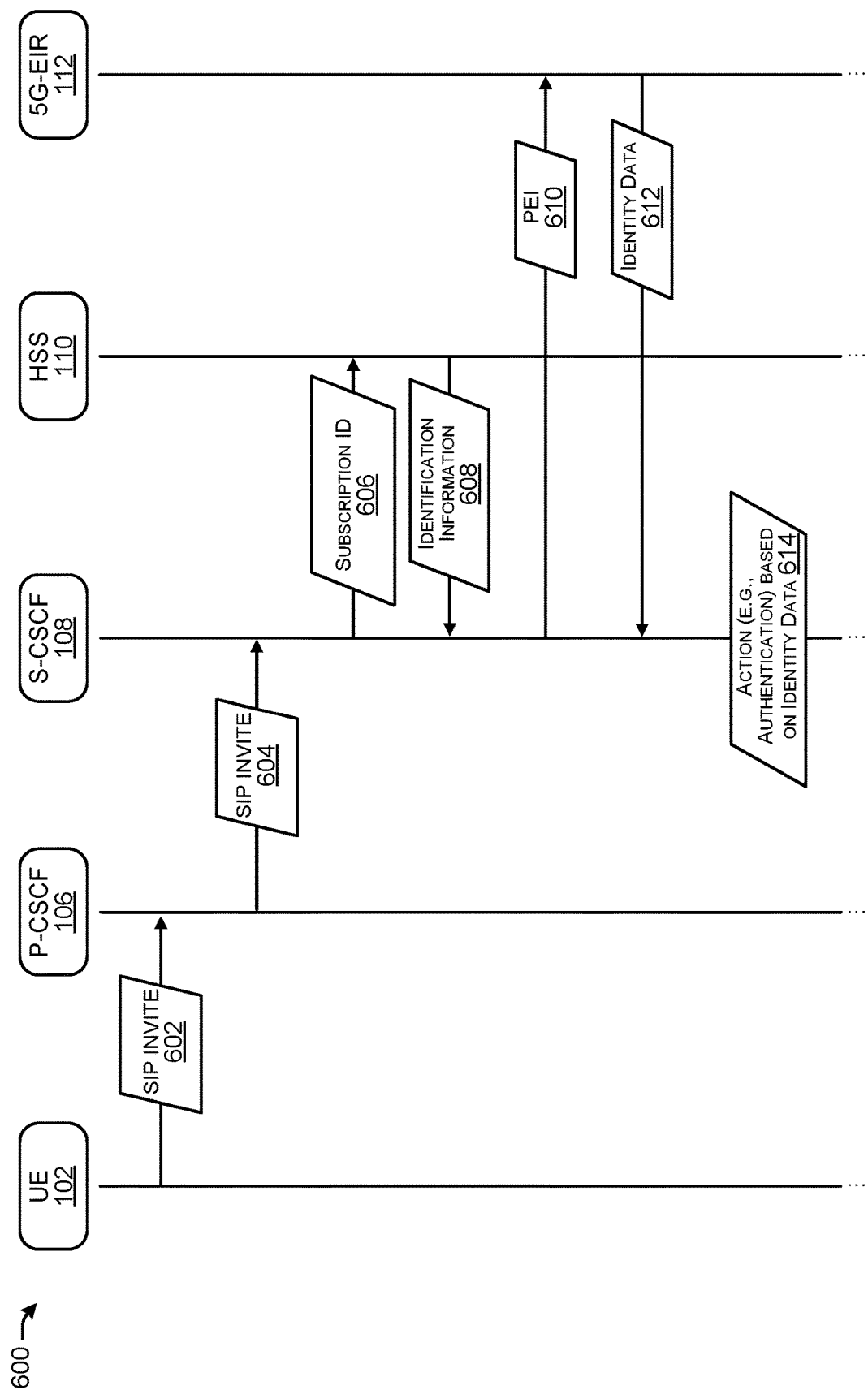
FIG. 6 illustrates an example flow between various components for authenticating a device in a network.

FIG. 6 illustrates an example flow 600 between various components for authenticating a device in a network.

For example, the call flow 600 illustrates data exchanged between the UE 102, the P-CSCF 106, the S-CSCF 108, the HSS 110, and the 5G-EIR 112. Other components may be involved before, during, or after this exchange, but have been omitted for simplicity.

The UE 102 can transmit a SIP INVITE 602 to the P-CSCF 106, which in turn can send a SIP INVITE 604 to the S-CSCF 108. In some instances, the SIP INVITE 604 is based on the SIP INVITE 602, and in some instances, the SIP INVITE 604 represents the forwarded SIP INVITE 602.

The S-CSCF 108 can receive the SIP INVITE 604 and can determine a device identifier or a subscription identifier associated with the SIP INVITE 604. Accordingly, the S-CSCF can send a request to the HSS 110 including a subscription ID (identifier) 606 associated with the UE 102.

The HSS 110 can receive the subscription ID 606 embodied in the request and can respond with identification information 608 associated with the subscription ID 606. Accordingly, the identification information 608 can be associated with the UE 102 as well. In some examples, the identification information 608 can include PEI, an IMEI, and/or an IMSI.

The S-CSCF 108, after receiving the identification information 608 from the HSS 110, can send a request comprising PEI 610 to the 5G-EIR 112. In some examples, the request can comprise a "GET" command. In some examples, the request can be in accordance with a RESTful HTTP 2.0 protocol. If the PEI 610 is associated with or found in the 5G-EIR 112, the 5G-EIR can provide identity data 612 to the S-CSCF. In some examples, the identity data 612 can be indicative of whether the UE is authorized, not authorized, partially authorized, or unknown.

Upon receiving the identity data 612, the S-CSCF 108 can perform an action based on the identity data 612. For example, the action 614 can comprise authenticating the UE 102 based on the identity data. Authenticating the UE 102 can comprise providing access to the UE 102 to establish communication session(s). If the UE 102 is not authenticated (e.g., the 5G-EIR 112 returns identity data indicating the UE is unknown or partially authorized) but the UE 102 is not known to be fraudulent, stolen, or on a blocked list, the S-CSCF 108 may query an EIR (e.g., using an IMEI) via another interface, if the network topology comprises an EIR (e.g., as in the system 300). In some examples, the 5G-EIR 112 may provide an indication that the UE 102 is associated with a blocked list, or the S-CSCF 108 may determine that the UE 102 is associated with a blocked list, based on the identity data 612.

Figure 7:
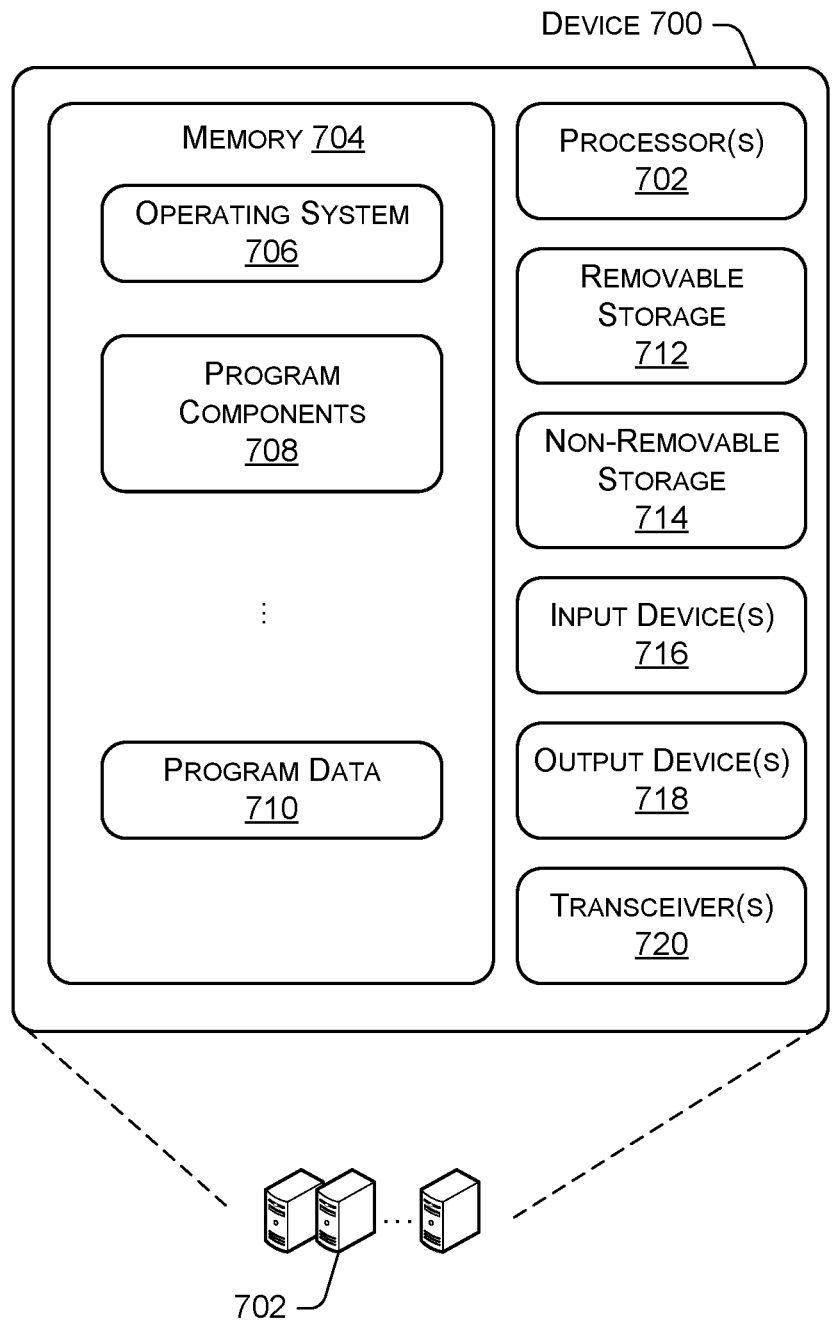
FIG. 7 is a block diagram of a device configured to implement the techniques discussed herein.

FIG. 7 is a block diagram of a device 700 configured to implement the techniques discussed herein. In some examples, the device 700 may implement the some or all of the flow 600 of FIG. 5 and/or of the process 800 of FIG. 7, discussed below.

FIG. 7 shows only basic, high-level components of the device 700. Generally, the device 700 may comprise any of various network components discussed herein, including those components illustrated in FIGS. 1-5. For example, the device 700 may comprise the S-CSCF 304 of FIG. 3. In some examples, the device 700 can be used to implement various components of a core network, a base station, and/or any servers, routers, gateways, administrative components, functions, or nodes that may be used within a cellular communication system, such as described above.

In various examples, the device 700 may include processor(s) 702 and memory 704. Depending on the exact configuration and type of computing device, the memory 704 may be volatile (such as RAM), non-volatile (such as ROM, flash memory, etc.) or some combination of the two. The memory 704 may include an operating system 706, one or more program components 708, and may include program data 710.

In some examples, the processor(s) 702 is a central processing unit (CPU), a graphics processing unit (GPU), both CPU and GPU, or other processing unit or component known in the art. Furthermore, the processor(s) 702 may include any number of processors and/or processing cores. The processor(s) 702 is configured to retrieve and execute instructions from the memory 704.

The memory 704 can also be described as non-transitory computer-readable media or machine-readable storage memory, and may include removable and non-removable media implemented in any method or technology for storage of information, such as computer executable instructions, data structures, program modules, or other data.

The memory 704 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The device 700 also includes additional data storage devices (removable and/or non-removable) such as, for example, magnetic disks, optical disks, or tape. Such additional storage is illustrated in FIG. 6 by removable storage 712 and non-removable storage 714. Tangible computer-readable media can include volatile and non-volatile, removable and non-removable media implemented in any method or technology for storage of information, such as computer readable instructions, data structures, program modules, or other data. The memory 704, the removable storage 712 and the non-removable storage 714 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 700. Any such tangible computer-readable media can be part of the device 700.

The memory 704, the removable storage 712, and/or the non-removable storage 714 may in some cases include storage media used to transfer or distribute instructions, applications, and/or data. In some cases, the memory 704, the removable storage 712, and/or the non-removable storage 714 may include data storage that is accessed remotely, such as network-attached storage that the device 700 accesses over some type of data communications network.

In various examples, any or all of the memory 704, the removable storage 712, and/or the non-removable storage 714 may store programming instructions that, when executed, implement some or all of the function functionality described herein.

The device 700 also can include input device(s) 716, such as a keypad, a cursor control, a touch-sensitive display, voice input device, etc., and output device(s) 718 such as a display, speakers, printers, etc. These devices are well known in the art and need not be discussed at length here.

As illustrated in FIG. 6, the device 700 also includes one or more wired or wireless transceiver(s) 720. For example, the transceiver(s) 720 can include a network interface card (NIC), a network adapter, a LAN adapter, or a physical, virtual, or logical address to connect to various networks, devices, or components illustrated in the systems 100, 200, 300, and/or 400, for example. To increase throughput when exchanging wireless data, the transceiver(s) 720 can utilize multiple-input/multiple-output (MIMO) technology. The transceiver(s) 720 can comprise any sort of wireless transceivers capable of engaging in wireless, radio frequency (RF) communication. The transceiver(s) 720 can also include other wireless modems, such as a modem for engaging in Wi-Fi, WiMAX, Bluetooth, infrared communication, and the like.

Figure 8:
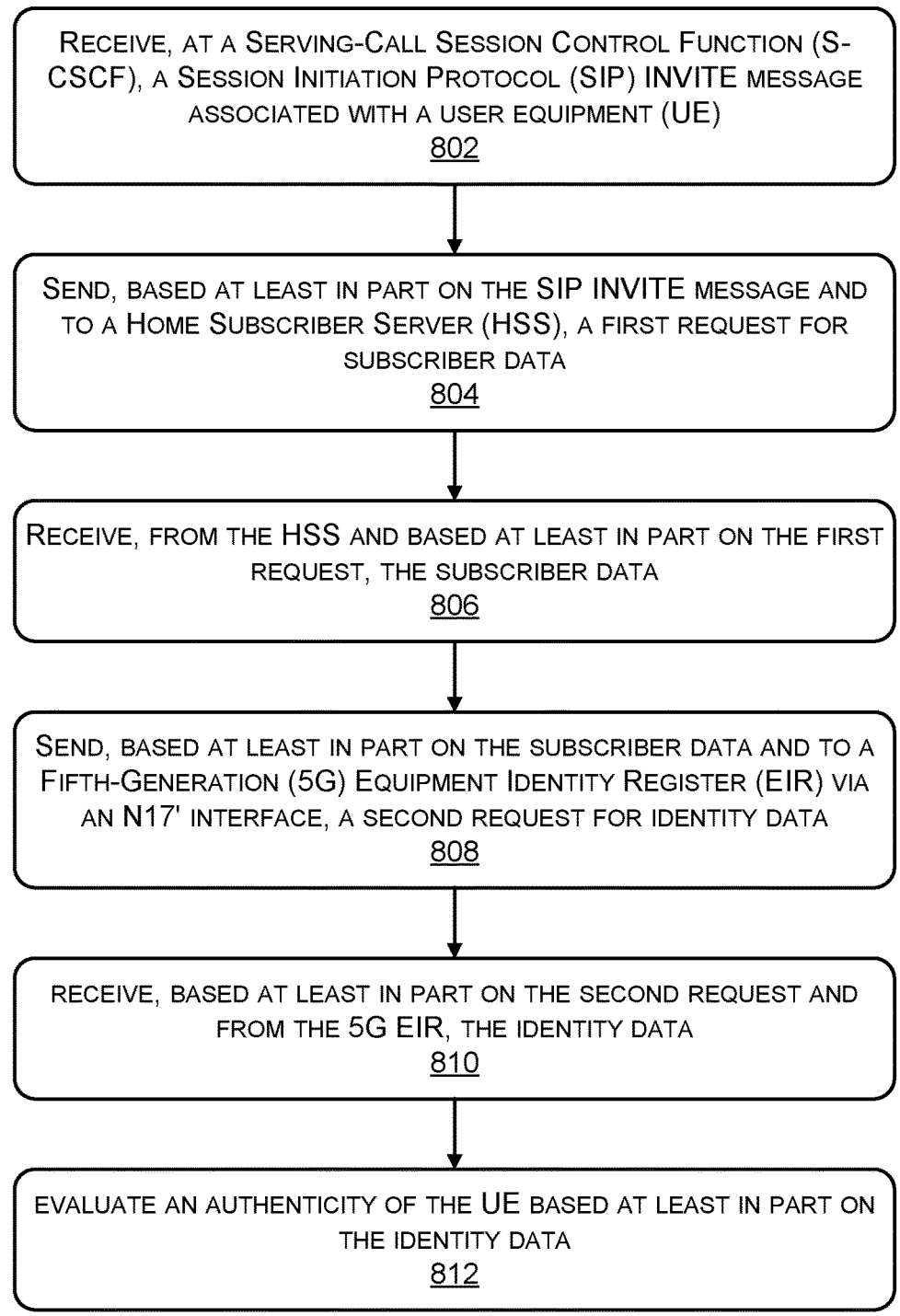
FIG. 8 illustrates an example process for a S-CSCF accessing a 5G-EIR via an N17' interface.

FIGS. 6 and 8 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 8 illustrates an example process for a S-CSCF accessing a 5G-EIR via an N17' interface. The example process 800 can be performed by the S-CSCF 108, 226, 304, and/or 404, or another component or device as discussed herein.

At operation 802, the process can include receiving, at a Serving-Call Session Control Function (S-CSCF), a Session Initiation Protocol (SIP) INVITE message associated with a user equipment (UE). In some examples, the UE may have been authenticated by an AMF and/or MME to access an IMS network. In some examples, the operation 802 can include receiving the SIP invite at a P-CSCF and/or other network node before being received at a S-CSCF.

At operation 804, the process can include sending, based at least in part on the SIP INVITE message and to a Home Subscriber Server (HSS), a first request for subscriber data. In some examples, the request may include a subscriber identifier, whereby the subscriber identifier is received in or is based on the SIP message.

At operation 806, the process can include receiving, from the HSS and based at least in part on the first request, the subscriber data. In some examples, the subscriber data may include, but is not limited to an IMSI (international mobile subscriber identity).

At operation 808, the process can include sending, based at least in part on the subscriber data and to a Fifth-Generation (5G) Equipment Identity Register (EIR) via an N17' interface, a second request for identity data. In some examples, the operation 808 can include sending another request to an EIR via an S12' interface. In some examples, the operation 808 can include determining or otherwise receiving an indication that a response was not available at the EIR or will not be available at the EIR (e.g., based on data received from the HSS). In some examples, the operation 808 can include sending a RESTful HTTP 2.0 GET command via an N17' interface to the 5G-EIR, as discussed herein.

In some examples, the operation 808 can include sending one or more of a permanent equipment identifier (PEI), an International Mobile Equipment Identity (IMEI), an International Mobile Subscriber Identity (IMSI), a subscription permanent identifier (SUPI), a globally unique temporary identifier (GUTI), etc.

At operation 810, the process can include receiving, based at least in part on the second request and from the 5G-EIR, the identity data. For example, the identity data can include an indication of whether the UE is authorized, not authorized, partially authorized, or unknown.

At operation 812, the process can include evaluating an authenticity of the UE based at least in part on the identity data. For example, the operation 812 can include determining if the UE is associated with a fraud list, a stolen list, a blocked list, and the like. In some examples, the operation 812 can include blocking or refusing service to a non-authorized device. In some examples, the operation 812 can include providing one or more communication services to a UE that is authorized to use a network.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
    receiving, at a Serving-Call Session Control Function (S-CSCF), a Session Initiation Protocol (SIP) INVITE message associated with a user equipment (UE);
    sending, based at least in part on the SIP INVITE message and to a Home Subscriber Server (HSS), a first request for subscriber data;
    receiving, from the HSS and based at least in part on the first request, the subscriber data, the subscriber data including a permanent equipment identifier (PEI) associated with the UE;
    sending, by the S-CSCF, based at least in part on the subscriber data, and to a Fifth-Generation (5G) Equipment Identity Register (EIR) via an N17' interface, a second request for identity data,
        wherein the endpoints of the N17' interface are the S-CSCF and the 5G EIR and the second request includes the PEI, and wherein the sending comprises determining to send the second request via the N17' interface rather than a S13 Diameter interface;
receiving, by the S-CSCF, based at least in part on the second request, and from the 5G-EIR via the N17' interface, the identity data, wherein the identity data is based on the PEI and comprises an indication that the UE is authorized, not authorized, partially authorized, or unknown; and
evaluating an authenticity of the UE based at least in part on the identity data, wherein the evaluating includes determining if the UE is associated with a fraud list or a blocked list.

2. The method of claim 1, wherein the second request is based at least in part on a RESTful HTTP 2.0 protocol.

3. The method of claim 1, further comprising:
sending the first request via an N70 interface.

4. The method of claim 1, wherein the subscriber data comprises an international mobile subscriber identity (IMSI) associated with the UE.

5. The method of claim 1, wherein the 5G-EIR is one of a plurality of 5G-EIRs, the method further comprising:
sending the second request to the 5G-EIR based at least in part on an indication received from a Network Repository Function (NRF).

6. The method of claim 1, further comprising:
based at least in part on evaluating the authenticity of the UE, at least one of:
authorizing a communication session associated with the UE; or
rejecting the UE from establishing a communication session.

7. A system comprising:
one or more processors; and
one or more non-transitory computer-readable media storing computer-executable instructions that, when executed, cause the one or more processors to perform operations comprising:
receiving, at a Serving-Call Session Control Function (S-CSCF), a Session Initiation Protocol (SIP) INVITE message associated with a user equipment (UE);
sending, based at least in part on the SIP INVITE message and to a Home Subscriber Server (HSS), a first request for subscriber data;
receiving, from the HSS and based at least in part on the first request, the subscriber data, the subscriber data including a permanent equipment identifier (PEI) associated with the UE;
sending, by the S-CSCF, based at least in part on the subscriber data, and to a Fifth-Generation (5G) Equipment Identity Register (EIR) via an N17' interface, a second request for identity data,
wherein the endpoints of the N17' interface are the S-CSCF and the 5G EIR and the second request includes the PEI, and
wherein the 5G-EIR is one of a plurality of 5G-EIRs and the sending comprises sending the second request to the 5G-EIR based at least in part on an indication received from a Network Repository Function (NRF);
receiving, by the S-CSCF, based at least in part on the second request, and from the 5G-EIR via the N17' interface, the identity data, wherein the identity data is based on the PEI and comprises an indication that the UE is authorized, not authorized, partially authorized, or unknown; and
evaluating an authenticity of the UE based at least in part on the identity data, wherein the evaluating includes determining if the UE is associated with a fraud list or a blocked list.

8. The system of claim 7, wherein the second request is based at least in part on a RESTful HTTP 2.0 protocol.

9. The system of claim 7, the operations further comprising:
sending the first request via an N70 interface.

10. The system of claim 7, wherein the subscriber data comprises an international mobile subscriber identity (IMSI) associated with the UE.

11. The system of claim 7, the operations further comprising:
determining to send the second request via the N17' interface rather than a S13 Diameter interface.

12. The system of claim 7, the operations further comprising:
based at least in part on evaluating the authenticity of the UE, at least one of:
authorizing a communication session associated with the UE; or
rejecting the UE from establishing a communication session.

13. One or more non-transitory computer-readable media storing computer-executable instructions that, when executed, cause one or more processors to perform operations comprising:
receiving, at a Serving-Call Session Control Function (S-CSCF), a Session Initiation Protocol (SIP) INVITE message associated with a user equipment (UE);
sending, based at least in part on the SIP INVITE message and to a Home Subscriber Server (HSS), a first request for subscriber data;
receiving, from the HSS and based at least in part on the first request, the subscriber data, the subscriber data including a permanent equipment identifier (PEI) associated with the UE;
sending, by the S-CSCF, based at least in part on the subscriber data, and to a Fifth-Generation (5G) Equipment Identity Register (EIR) via an N17' interface, a second request for identity data, wherein the endpoints of the N17' interface are the S-CSCF and the 5G EIR and the second request includes the PEI;
receiving, by the S-CSCF, based at least in part on the second request, and from the 5G-EIR via the N17' interface, the identity data, wherein the identity data is based on the PEI and comprises an indication that the UE is authorized, not authorized, partially authorized, or unknown; and
evaluating an authenticity of the UE based at least in part on the identity data, wherein the evaluating includes determining if the UE is associated with a fraud list or a blocked list.

14. The one or more non-transitory computer-readable media of claim 13, wherein the second request is based at least in part on a RESTful HTTP 2.0 protocol.

15. The one or more non-transitory computer-readable media of claim 13, the operations further comprising:
sending the first request via an N70 interface.

16. The one or more non-transitory computer-readable media of claim 13, the operations further comprising:
based at least in part on evaluating the authenticity of the UE, at least one of:
authorizing a communication session associated with the UE; or rejecting the UE from establishing a communication session.

* * * * *